Patented July 26, 1927.

1,636,796

UNITED STATES PATENT OFFICE.

ALBERT D. ALEXANDER, OF FREDERICKSBURG, VIRGINIA, ASSIGNOR TO MABEL VIOLA ALEXANDER, OF FREDERICKSBURG, VIRGINIA.

BUSHING EXTRACTOR.

Application filed February 11, 1925. Serial No. 8,486.

My invention relates to bushing extractors, and more particularly to extractors for use in connection with automobiles and the like, where a quick, efficient tool is desired.

The object of the invention is to so construct the same that it will have but few parts, will be strong and durable, may be easily manipulated, and will be efficient.

In the drawings forming a part of this specification, and in which like symbols of reference represent corresponding parts in the several views:—

Figure 1:
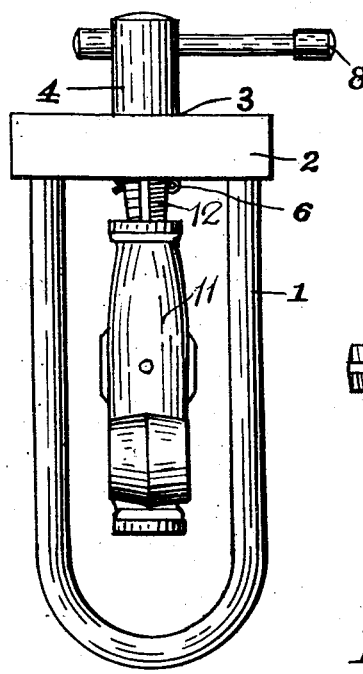
Fig. 1 is a side view of the device.
Figure 2:
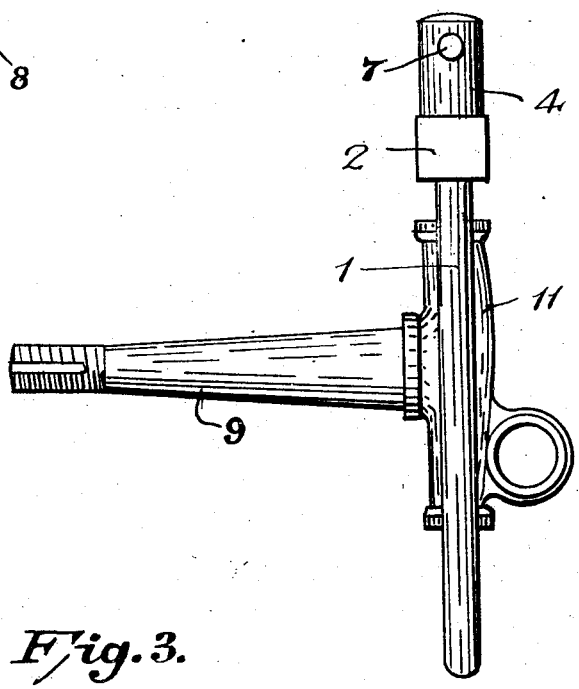
Fig. 2 is a view at right angles to Fig. 1.
Figure 3:
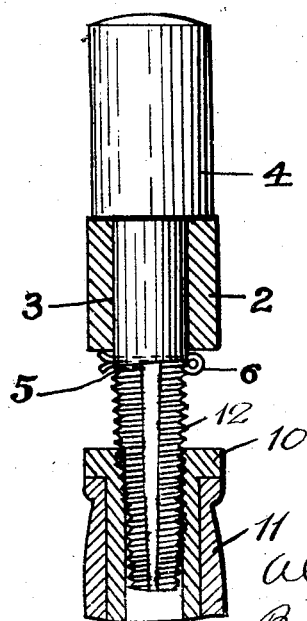
Fig. 3 is a sectional view, showing the device inserted in the bushing preparatory to withdrawing the same.

In the drawings, 1 represents the yoke; 2 a cross-piece connecting the same; and 3 a bearing in the cross-piece for reception of the bushing extractor or tap 4 having a screw portion 12. The extractor or tap 4 has formed in the same a perforation or orifice 5 for reception of a cotter-pin 6, the object of the same being to lock the extractor in the cross-piece. 7 is a bearing in the top of the screw-shaft for reception of a handle or lever 8 for operating the device.

9 is the axle of the automobile. 10 is the bushing and 11 the bearing of the same.

When the extractor is applied to the bushing the yoke may be struck on any hard substance to release the same.

The operation of the device will be apparent from the foregoing description. The screw of the extractor takes into the bushing and securely holds the same. The handle 8 is then manipulated and the yoke may be struck on any hard substance which will immediately release the bushing, which may be withdrawn. If desired, the axle may be used as the handle, the result being the same as if the handle itself had been used.

Having now fully described my invention, what I claim as new, and desire to secure by Letters-Patent, is:—

1. A bushing extractor, comprising a yoke having a cross-piece connecting its ends, a bearing in the cross-piece, a screw-shaft adapted to be journaled in the cross-piece, and means to operate the shaft so that the screw will engage the bushing and remove the same.

2. A bushing extractor, comprising a screw-shaft, a yoke having a bearing for reception of the screw-shaft, means to operate the shaft, and means to lock the shaft to the yoke.

3. A bushing extractor, comprising a yoke having a cross-piece connecting the same, a bearing in the cross-piece, a screw-shaft in the bearing, and means to rotate the shaft.

In testimony whereof I affix my signature.

ALBERT D. ALEXANDER.